Aug. 10, 1948.     E. V. BERGSTROM     2,446,805
HEATER
Filed June 1, 1946     2 Sheets-Sheet 1
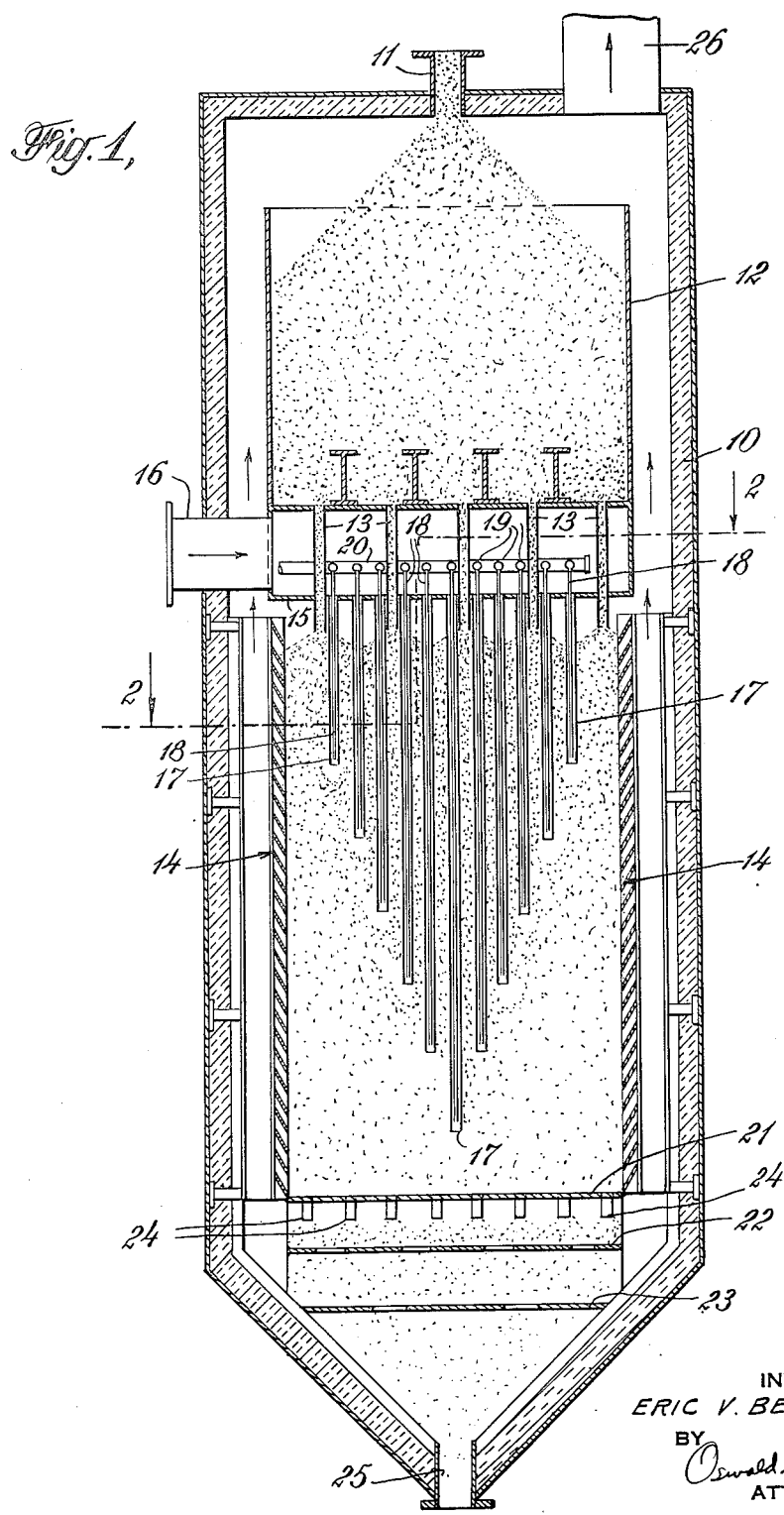
Fig.1,
INVENTOR
ERIC V. BERGSTROM
BY Oswald G. Hayes
ATTORNEY Aug. 10, 1948.    E. V. BERGSTROM    2,446,805
HEATER
Filed June 1, 1946    2 Sheets-Sheet 2
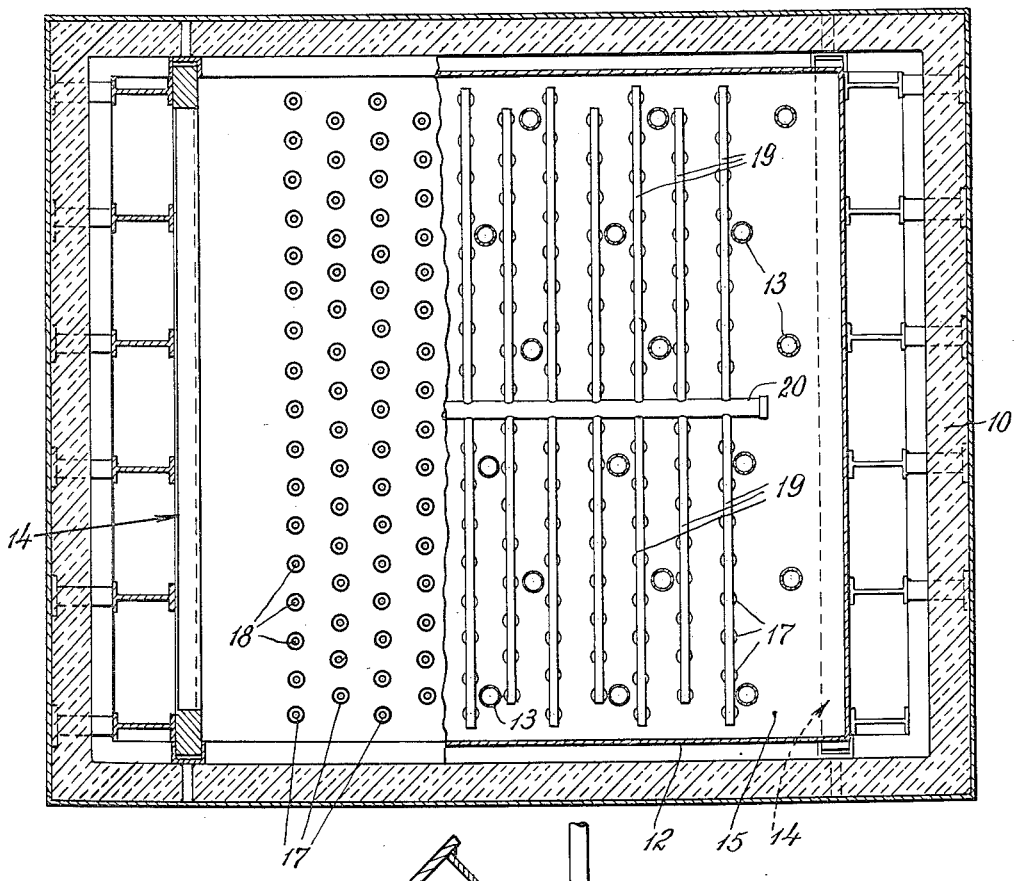
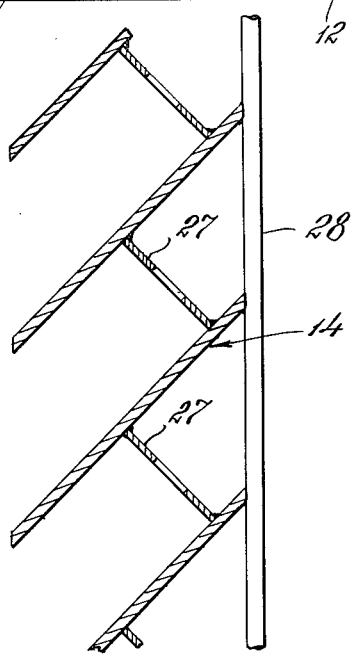
INVENTOR
ERIC V. BERGSTROM
BY
Oswald G. Hayes
ATTORNEY Patented Aug. 10, 1948

2,446,805

UNITED STATES PATENT OFFICE 2,446,805

HEATER

Eric V. Bergstrom, Short Hills, N. J., assignor to Socony-Vacuum Oil Company, Incorporated, a corporation of New York Application June 1, 1946, Serial No. 673,816

12 Claims. (Cl. 263—19)

This invention relates to a process and apparatus for raising the temperature of a granular solid heat transfer agent.

In many processes, the transfer of heat by means of a hot granular solid presents marked advantages. For example, gas oil and other hydrocarbon charge materials may be converted to low boiling olefins such as ethylene by being rapidly heated to elevated temperatures on the order of 1500° F. and above for a reaction time of a fraction of a second, say 0.2 second. The reaction mixture must be rapidly cooled at the end of the desired reaction time in order to avoid secondary reactions in the nature of condensation to aromatic hydrocarbons. Such rapid changes in temperature are difficult to accomplish in conventional heaters such as tube stills, shell stills and the like. The extensive cracking which results under the temperatures which must be applied to confining metal surfaces, rapidly lays down large carbonaceous deposits which clog the tubes and seriously cut down heat transfer efficiency.

The above noted disadvantages are overcome by passing the charge hydrocarbons in direct contact with a bed of highly heated granular solid and thereafter quenching the hot reaction mixture.

The present invention provides a method and apparatus for preparing the highly heated granular solid heat transfer agent by generating a flame in a moving bed of granular solid. According to the invention, a very large surface for disengaging the heating gases from contact with the granular solid is rendered available in a bed of relatively small cross-sectional area. This desirable result is accomplished by utilizing the principle of lateral flow of heating gases through the downwardly moving bed. In order to utilize the sides of the bed as disengaging surfaces to maximum extent, the flame is produced at a plurality of points of varying depth from the top of the bed and the products of combustion are flowed laterally from the several points to the disengaging surfaces at one or more lateral boundaries of the moving bed.

These and other objects and advantages of the invention are brought out by the discussion below of a specific embodiment thereof illustrated in the annexed drawings; wherein Figure 1 is a vertical section through a heater embodying the principles of the invention;

Figure 2 is a section on line 2—2 of Figure 1; and

Figure 3 is an enlarged detail view in section showing apertured flow control plates adapted for use in connection with the lateral walls of the heater shown in Figures 1 and 2.

Referring now to Figure 1, the heater is enclosed by an insulated case 10 having an inlet pipe 11 at the top thereof for admission of a granular solid heat transfer agent such as fused alumina having an average particle size of about 0.3 inch. In the top of case 10 is a hopper 12 to receive and maintain a bulk supply of the granular solid. The solid is fed downwardly to the actual heating zone from hopper 12 by feed tubes 13 which are distributed uniformly across the top of the heating chamber. The heating section is defined by lateral walls, at least a portion of which are adapted to permit the passage of gases, for example, the louvered walls shown in Figure 1 at 14. As shown in Figure 2, the feed tubes 13 may be staggered somewhat.

Above the compact moving bed in the heating section is an air plenum chamber defined by the bottom of hopper 12 and a plate 15 parallel thereto. Air is admitted to the plenum chamber by an inlet port 16 and is distributed from the plenum chamber into the heating bed by a plurality of drop pipes 17. Fuel is supplied for generation of a flame within the compact moving bed by pipes 18 depending from branches 19 and a suitable header 20. As shown, the pipes 18 extend down through the drop pipes 17 to a point near the bottom open end of the latter, at which point the fuel and air are mingled to produce a combustible mixture. Liquid fuel may be used in this apparatus to good advantage but gaseous fuel is preferred since it is possible to produce with gaseous fuel a combustible mixture at a temperature below its ignition point, usually about 600° F. for hydrocarbon gases, and thus produce the flame only after the combustible mixture has actually penetrated the compact bed of solid heat transfer agent. It will be seen that the bottom of each of the drop pipes 17 opens to a void space in the compact bed since the solid will lie at about the angle of repose with a surface in the form of an inverted cone below the ends of the drop pipes 17. When following the preferred method of supplying air and gaseous fuel at temperatures such that the mixture will leave drop pipes 17 at a temperature below the ignition temperature, the ends of the drop pipes are protected against excessive abrasion by the moving solids and against direct contact with the heating flame. In a typical operation for continuous circulation of granular solid heat transfer agent in a plant for the manufacture of ethylene from gas oil, the granular solid may enter the top of the heater at a temperature on the order of 800 to 1000° F. to be heated therein to a temperature above about 1500° F. The granular solid moving downwardly through the heater will therefore have a preheating effect on air supplied by drop pipes 17 and this factor should be taken into account in preheating air supplied at inlet port 16.

As shown in Figure 1, the lower ends of drop pipes 17 are spaced along a sloping plane with the shortest drop pipes nearest to the louvered walls 14 and the longest drop pipes at points which are farthest removed from the louvered walls. It is preferred that the drop pipes nearest the louvered walls 14, i. e., the shortest pipes, be spaced a considerable distance, substantially greater than the average distance between adjacent drop pipes, from the louvered walls 14. By this means there is provided a fairly thick layer of relatively cold granular solid against the louvered walls 14 in the upper portion of the heating section to act as a heat economizer. This economizer layer becomes progressively thinner toward the bottom of the heating section and substantially disappears at the lower extremity thereof. It will be apparent that the portion of granular solid which has not been heated by flame would show as a V in the section of Fig. 1 having its apex below the end of the longest pipe 17. The hot gases passing through the heated portion will enter a cooler portion against the wall 14. This is the economizer layer to which reference is made. Gases are rapidly chilled, heating successively further parts of this layer as it passes downwardly until it disappears near the bottom of the heater.

According to the preferred method of operation, feeding a mixture of air and gaseous fuel at a temperature below the ignition point, a flame is initiated in the compact bed of granular solids at a point slightly removed from the open lower end of each of the drop pipes 17. The heat of this flame is rapidly dissipated to the granular solid and the products of combustion from the shortest drop pipes 17 cooled to about the inlet temperature of the granular solid. With respect to each of the other drop pipes, the products of combustion drop to the granular solid outlet temperature and pass laterally through the bed of heated solid until they contact the economizer layer lying against the louvered walls 14 at which point they give up further heat to be cooled to a temperature on the order of the granular solid inlet temperature. Because of the extremely rapid transfer of heat from the products of combustion to the granular solid, the boundary between relatively hot and relatively cold solid is fairly well defined and consists of planes which would show in the section of Figure 1 as a pair of triangles each having its apex slightly below the bottom end of the shortest drop pipe 17 with one leg of the angle sloping toward the louvered wall 14 at the bottom of the heating section and the other leg sloping toward the bottom end of the longest drop pipe 17.

The embodiment here shown provides a further advantage in that the largest particles tend to move down the sides of the vessel when supplied from a centrally fed hopper as shown. Thus the disengaging surfaces are made up of larger sizes of granules, thus facilitating separation of the gases.

The highly heated granular solid is withdrawn uniformly from the bottom of the heater by means of a series of flow control plates 21, 22 and 23. A large number of flow pipes 24 depend from the upper plate 21 in order to give uniform withdrawal from a number of points uniformly spaced about the cross-section of the bottom of the heating section. A lesser number of orifices are provided in plate 22 so that each of the orifices in this plate draws from four flow pipes 24 spaced uniformly thereabove to cause uniform flow in the pipes 24. Similarly, a still smaller number of orifices in plate 23 induces uniform flow through the orifices of plate 22 and the solid is withdrawn at discharge port 25 for transfer to the point of use. Cooled products of combustion from the louvered walls 14 are collected and discharged at outlet 26 for transfer to a suitable stack or economizer.

Referring now to the detail section shown in Figure 3, uniformity of gas discharge over the entire disengaging surface may be insured by placing apertured plates 27 between each two adjacent louvers of the wall 14 (this view also shows a spacing rod 28 along the discharge face of the wall 14). The apertures in control plates 27 are so designed as to give a substantial pressure drop across the plates 27 and thus induce uniform rate of gaseous flow over the entire surface of the wall 14. It may be noted that possibility of channelling is an ever-present concern in passing fluids through granular solid beds. The use of restricted apertures greatly reduces the possibility that gas flow through one part of wall 14 will be greater than that through another part. In this manner, tendency to channel is materially inhibited since the gases will tend to follow the shortest possible path.

I claim:

1. A heater comprising a vertical shell having walls on opposite sides formed of louvers sloped downwardly toward the interior of said shell, a hopper above said shell for supplying granular solid material to said shell, a plurality of feed pipes extending downwardly from said hopper into the top of said shell, a manifold above said shell, a plurality of drop pipes extending downwardly into said shell from said manifold, said drop pipes being distributed across said shell between said louvered sides and being of varying length with the longest drop pipes spaced about midway between said louvered sides and the drop pipes of progressively shorter length being spaced at progressively shorter distances from said louvered sides, the distance between the shortest drop pipes and said louvered sides being greater than the distance between adjacent drop pipes of differing length, a smaller pipe in each of said drop pipes for supplying a fluid thereto independently of said manifold, means to supply a fluid to said smaller pipes, means to withdraw granular solid uniformly across the bottom of said shell, apertured plates extending across the space between adjacent louvers to throttle gas flow therethrough, and means to withdraw gases from outside said louvered sides.

2. A heater comprising a vertical shell having walls on opposite sides formed of louvers sloped downwardly toward the interior of said shell, a hopper above said shell for supplying granular solid material to said shell, a plurality of feed pipes extending downwardly from said hopper into the top of said shell, a manifold above said shell, a plurality of drop pipes extending downwardly into said shell from said manifold, said drop pipes being distributed across said shell between said louvered sides and being of varying length with the longest drop pipes spaced about midway between said louvered sides and the drop pipes of progressively shorter length being spaced at progressively shorter distances from said louvered sides, the distance between the shortest drop pipes and said louvered sides being substantially greater than the distance between adjacent drop pipes of differing length, a smaller pipe in each of said drop pipes for supplying a fluid thereto independently of said manifold, means to supply a fluid to said smaller pipes, means to withdraw granular solid uniformly across the bottom of said shell and means to withdraw gases from outside said louvered sides.

3. A heater comprising a vertical shell having walls on opposite sides formed of louvers sloped downwardly toward the interior of said shell, a hopper above said shell for supplying granular solid material to said shell, a plurality of feed pipes extending downwardly from said hopper into the top of said shell, a manifold above said shell, a plurality of drop pipes extending downwardly into said shell from said manifold, said drop pipes being distributed across said shell between said louvered sides and being of varying length with the longest drop pipes spaced about midway between said louvered sides and the drop pipes of progressively shorter length being spaced at progressively shorter distances from said louvered sides, a smaller pipe in each of said drop pipes for supplying a fluid thereto independently of said manifold, means to supply a fluid to said smaller pipes, means to withdraw granular solid uniformly across the bottom of said shell, apertured plates extending across the space between adjacent louvers to throttle gas flow therethrough, across the bottom of said shell, and means to withdraw gases from outside said louvered sides.

4. A heater comprising a vertical shell having walls on opposite sides formed of louvers sloped downwardly toward the interior of said shell, a hopper above said shell for supplying granular solid material to said shell, a plurality of feed pipes extending downwardly from said hopper into the top of said shell, a manifold above said shell, a plurality of drop pipes extending downwardly into said shell from said manifold, said drop pipes being distributed across said shell between said louvered sides and being of varying length with the longest drop pipes spaced about midway between said louvered sides and the drop pipes of progressively shorter length being spaced at progressively shorter distances from said louvered sides, a smaller pipe in each of said drop pipes for supplying a fluid thereto independently of said manifold, means to supply a fluid to said smaller pipes, means to withdraw granular solid uniformly across the bottom of said shell and means to withdraw gases from outside said louvered sides.

5. A heater comprising a vertical shell having walls on opposite sides formed of louvers sloped downwardly toward the interior of said shell, means to supply granular solid material to the top of said shell, a manifold above said shell, a plurality of drop pipes extending downwardly into said shell from said manifold, said drop pipes being distributed across said shell between said louvered sides and being of varying length with the longest drop pipes spaced about midway between said louvered sides and the drop pipes of progressively shorter length being spaced at progressively shorter distances from said louvered sides, a smaller pipe in each of said drop pipes for supplying a fluid thereto independently of said manifold, means to supply a fluid to said smaller pipes, means to withdraw granular solid uniformly across the bottom of said shell and means to withdraw gases from outside said louvered sides.

6. A heater comprising a vertical shell having at least one side formed of louvers sloped downwardly toward the interior of said shell, means to supply granular solid material to the top of said shell, means to generate a flame at each of a plurality of points within said shell, said points varying in depth from the top of said shell and in distance from said louvered side, the points of progressively greater depth being spaced at progressively greater distance from said louvered side, means to withdraw granular solid uniformly across the bottom of said shell and means to withdraw gases from outside said louvered side.

7. A process for heating granular solid material which comprises passing said material downwardly as a substantially compact moving bed, generating a heating flame at each of a plurality of flame points in said bed, flowing the resultant products of combustion laterally of said bed and disengaging them from contact with said bed at a plurality of disengaging points spaced along vertical boundaries of said bed, said flame points being spaced downwardly from the top of said bed at progressively greater depths as the distance thereof from said disengaging points is progressively greater, and throttling flow of gases at said disengaging points to produce uniform flow of gases laterally of said bed.

8. A process for heating granular solid material which comprises passing said material downwardly as a substantially compact moving bed, generating a heating flame at a plurality of flame points in said bed, flowing the resultant products of combustion laterally of said bed and disengaging them from contact with said bed at disengaging surfaces along vertical boundaries of said bed, said flame points being spaced downwardly from the top of said bed at progressively greater depths as the distance thereof from said disengaging surfaces is progressively greater, and throttling flow of gases at said disengaging surfaces to produce uniform flow of gases laterally of said bed.

9. A process for heating granular solid material which comprises passing said material downwardly as a substantially compact moving bed, generating a heating flame at a plurality of flame points in said bed, and flowing the resultant products of combustion laterally of said bed and disengaging them from contact with said bed at disengaging surfaces along vertical boundaries of said bed, said flame points being spaced downwardly from the top of said bed at progressively greater depth as the distance thereof from said disengaging surfaces is progressively greater.

10. A process for heating granular solid material which comprises passing said material downwardly as a substantially compact moving bed, supplying to each of a plurality of flame points in said bed a mixture of air and gaseous fuel at a temperature below the ignition temperature of said mixture and igniting said mixture to generate a flame at each of said points, flowing the resultant products of combustion laterally of said bed and disengaging them from contact with said bed at a plurality of disengaging points spaced along vertical boundaries of said bed, said flame points being spaced downwardly from the top of said bed at progressively greater depths as the distance thereof from said disengaging points is progressively greater, and throttling flow of gases at said disengaging points to produce uniform flow of gases laterally of said bed.

11. A process for heating granular solid material which comprises passing said material downwardly as a substantially compact moving bed, supplying to each of a plurality of flame points in said bed a mixture of air and gaseous fuel at a temperature below the ignition temperature of said mixture and igniting said mixture to generate a flame at each of said points, flowing the resultant products of combustion laterally of said bed and disengaging them from contact with said bed at disengaging surfaces along vertical boundaries of said bed, said flame points being spaced downwardly from the top of said bed at progressively greater depths as the distance thereof from said disengaging surfaces is progressively greater, and throttling flow of gases at said disengaging surfaces to produce uniform flow of gases laterally of said bed.

12. A process for heating granular solid material which comprises passing said material downwardly as a substantially compact moving bed, supplying to each of a plurality of flame points in said bed a mixture of air and gaseous fuel at a temperature below the ignition temperature of said mixture and igniting said mixture to generate a flame at each of said points, and flowing the resultant products of combustion laterally of said bed and disengaging them from contact wth said bed at disengaging surfaces along vertical boundaries of said bed, said flame points being spaced downwardly from the top of said bed at progressively greater depths as the distance thereof from said disengaging surfaces is progressively greater.

ERIC V. BERGSTROM.

REFERENCES CITED

The following references are of record in the file of this patent:

UNITED STATES PATENTS

| Number | Name | Date |
|---|---|---|
| 2,386,670 | Evans | Oct. 9, 1945 |

FOREIGN PATENTS

| Number | Country | Date |
|---|---|---|
| 828,944 | France | June 3, 1938 |